(12) United States Patent
Sukumaran et al.

(10) Patent No.: US 11,210,274 B2
(45) Date of Patent: Dec. 28, 2021

(54) PREDICTION AND REPAIR OF DATABASE FRAGMENTATION

(71) Applicant: Dell Products L.P., Round Rock, TX (US)

(72) Inventors: Shanand Reddy Sukumaran, Kulim (MY); Ching Siew Hor, Bayan Lepas (MY); Ashish Kumar Palo, Damanjodi (IN)

(73) Assignee: Dell Products L.P., Round Rock, TX (US)

( * ) Notice: Subject to any disclaimer, the term of this patent is extended or adjusted under 35 U.S.C. 154(b) by 459 days.

(21) Appl. No.: 16/396,103

(22) Filed: Apr. 26, 2019

(65) Prior Publication Data

US 2020/0341955 A1   Oct. 29, 2020

(51) Int. Cl.
  *G06F 16/21*    (2019.01)
  *G06F 16/17*    (2019.01)
(52) U.S. Cl.
  CPC ........ *G06F 16/217* (2019.01); *G06F 16/1724* (2019.01); *G06F 16/1734* (2019.01)
(58) Field of Classification Search
  CPC . G06F 16/217; G06F 16/1724; G06F 16/1734
  USPC ....................................................... 707/693
  See application file for complete search history.

(56) References Cited

U.S. PATENT DOCUMENTS

| | | | |
|---|---|---|---|
| 2005/0198062 A1* | 9/2005 | Shapiro | G06F 16/2282 |
| 2017/0068675 A1* | 3/2017 | Hazel | G06F 16/23 |
| 2017/0235745 A1* | 8/2017 | Hoobler, III | G06F 11/1469 |
| | | | 707/639 |
| 2017/0351721 A1* | 12/2017 | le Mar | G06F 16/24542 |
| 2020/0019633 A1* | 1/2020 | Kathirvel | G06N 20/00 |
| 2020/0259347 A1* | 8/2020 | Pereira | H02J 7/0045 |

OTHER PUBLICATIONS

Dana Van Aken "Automatic Database Management System Tuning Through Large-Scale Machine Learning" May 9, 2017 (16 pages) (Year: 2017).*

* cited by examiner

*Primary Examiner* — James Trujillo
*Assistant Examiner* — Fariborz Khoshnoodi
(74) *Attorney, Agent, or Firm* — Krishnendu Gupta; Deepika Bhayana; Dorothy Wu Chiang

(57) ABSTRACT

Methods, information handling systems and computer readable media are disclosed for detection and repair of fragmentation in databases. In one embodiment, a method includes obtaining log data reflecting transactions in a database, where the log data is generated during operation of the database. The method continues with applying a machine learning classification model to at least a portion of the log data to obtain a first prediction, where the first prediction indicates whether defragmentation of the database should be scheduled. In this embodiment the method also includes using a machine learning time series forecasting model to obtain a second prediction, where the second prediction identifies a future time interval of low relative database utilization, and scheduling a defragmentation procedure for performance during the future time interval of low relative database utilization.

20 Claims, 7 Drawing Sheets

PREDICTION AND REPAIR OF DATABASE FRAGMENTATION

The present disclosure relates to database maintenance, and more particularly to methods and systems for detection and repair of database fragmentation using machine learning techniques.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Use of an information handling system may involve accessing of information through an information store in the form of a database. In modern databases, a vast amount of digital content is stored using a relational model of data organization. Various software systems used to maintain or manage such relational databases are known as a Relational Database Management System (RDBMS). Thus, an RDBMS (or, more simply, a DBMS) is a software tool for database development, administration, and management. Virtually all modern relational database systems use Structured Query Language (SQL) as the language for querying and maintaining the database (DB). Some examples of an RDBMS include an Oracle® server, a Microsoft® SQL server, a MySQL (open source) system, an IBM® DB2 system, and so on. In the discussion herein, the terms "RDBMS", "DBMS," "database management system," "database manager," "SQL server", and other similar terms may be used interchangeably to refer to a relational database management tool.

Relational databases store data in two-dimensional tables with rows representing records and columns representing fields. Multiple tables of the database can be related if the tables have a common field. In order to speed searching for records within tables, relational databases often include indexes. An index is a data structure containing each value of a particular field in a table, along with a pointer to each record in the table containing that value of the field. Use of an index can make searching a table for values of an indexed field much faster. When alterations are made to the table, such as insertion, updating or deleting of records, corresponding alterations are made to associated indexes as well.

Database management systems typically employ specifically-sized fundamental units of physical storage space for managing storage of database tables and indexes. For example, the database software provided by Oracle Corporation uses a "block" as the fundamental unit of storage, where the size of the block can be set between approximately 2 kilobytes (kB) and 32 kB, with a default size of approximately 8 kB. The database software provided by Microsoft Corporation uses a "page" of approximately 8 kB. Allocation of data into these blocks or pages during database operations such as insertion or deleting of records can, over time, result in tables and indexes occupying non-contiguous ranges of the blocks or pages, or in data within tables or indexes being stored in a non-contiguous manner within a block or page. Such non-contiguous storage can be generally referred to as "fragmentation" of a table, index or database. Depending on the specific nature of the fragmentation and the types of operations performed in a fragmented database, fragmentation can result in reduced database performance.

SUMMARY

Methods, information handling systems and computer readable media are disclosed for detection and repair of fragmentation in databases. In one embodiment, a method includes obtaining log data reflecting transactions in a database, where the log data is generated during operation of the database. The method continues with applying a machine learning classification model to at least a portion of the log data to obtain a first prediction, where the first prediction indicates whether defragmentation of the database should be scheduled. In this embodiment the method also includes using a machine learning time series forecasting model to obtain a second prediction, where the second prediction identifies a future time interval of low relative database utilization, and scheduling a defragmentation procedure for performance during the future time interval of low relative database utilization.

The foregoing is a summary and thus contains, by necessity, simplifications, generalizations and omission of detail; consequently those skilled in the art will appreciate that the summary is illustrative only and is not intended to be in any way limiting. Other aspects, inventive features, and advantages, as defined solely by the claims, will become apparent in the non-limiting detailed description set forth below.

BRIEF DESCRIPTION OF THE DRAWINGS

Embodiments of methods and systems such as those disclosed herein may be better understood, and their numerous objects, features, and advantages made apparent to those skilled in the art by reference to the accompanying drawings. For ease of discussion, the same reference numbers in different figures may be used to indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Figure 1:
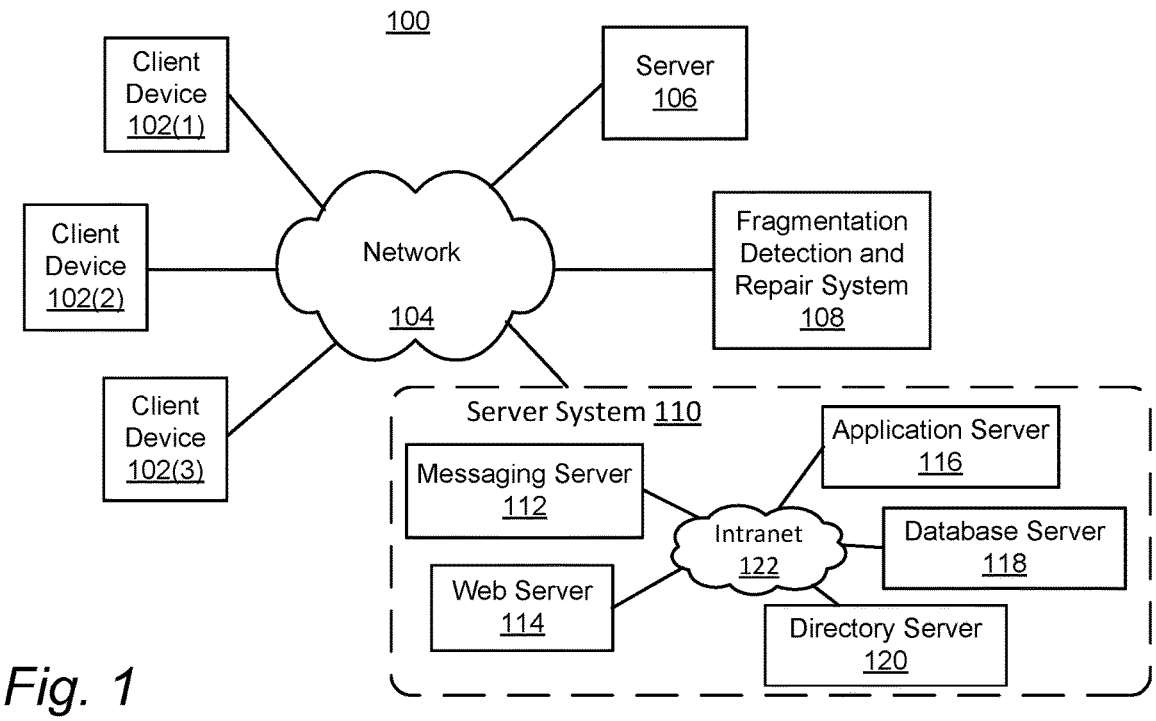
FIG. 1 is a simplified block diagram illustrating an example of a network environment including multiple information handling systems, and suitable for implementing aspects of an embodiment of the present disclosure.

A network environment 100 including multiple networked information handling systems is shown in FIG. 1. In the embodiment of FIG. 1, client computing devices 102 (1)-(3), server computing device 106, fragmentation detection and repair system 108, and server system 110 are communicatively coupled to one another via network 104. Client computing devices 102(1)-(3), server 106 and fragmentation detection and repair system 108 are embodiments of information handling systems as described above and elsewhere herein, and may take any of the various forms described, including personal computers, tablet computers, smartphones, or servers, as appropriate.

As noted above, an information handling system may include an aggregate of instrumentalities. For example, as used in this disclosure, "server" may include a server system such as server system 110, where a server system includes multiple networked servers configured for specific functions. As an example, server system 110 includes a messaging server 112, web server 114, application server 116, database server 118 and directory server 120, interconnected with one another via an intranet 122. Network 104 includes one or more networks suitable for data transmission, which may include local area networks (LANs), wide area networks (WANs), storage area networks (SANs), the Internet, or combinations of these. In an embodiment, network 104 includes a publicly accessible network, such as a public switched telephone network (PSTN), a DSL connection, a cable modem connection or large bandwidth trunks (e.g., communications channels providing T1 or OC3 service). Such networks may also include cellular or mobile telephone networks and other wireless networks such as those compliant with the IEEE 802.11 standards. Intranet 122 is similar to network 104 except for being, typically, private to the enterprise operating server system 110.

Figure 2:
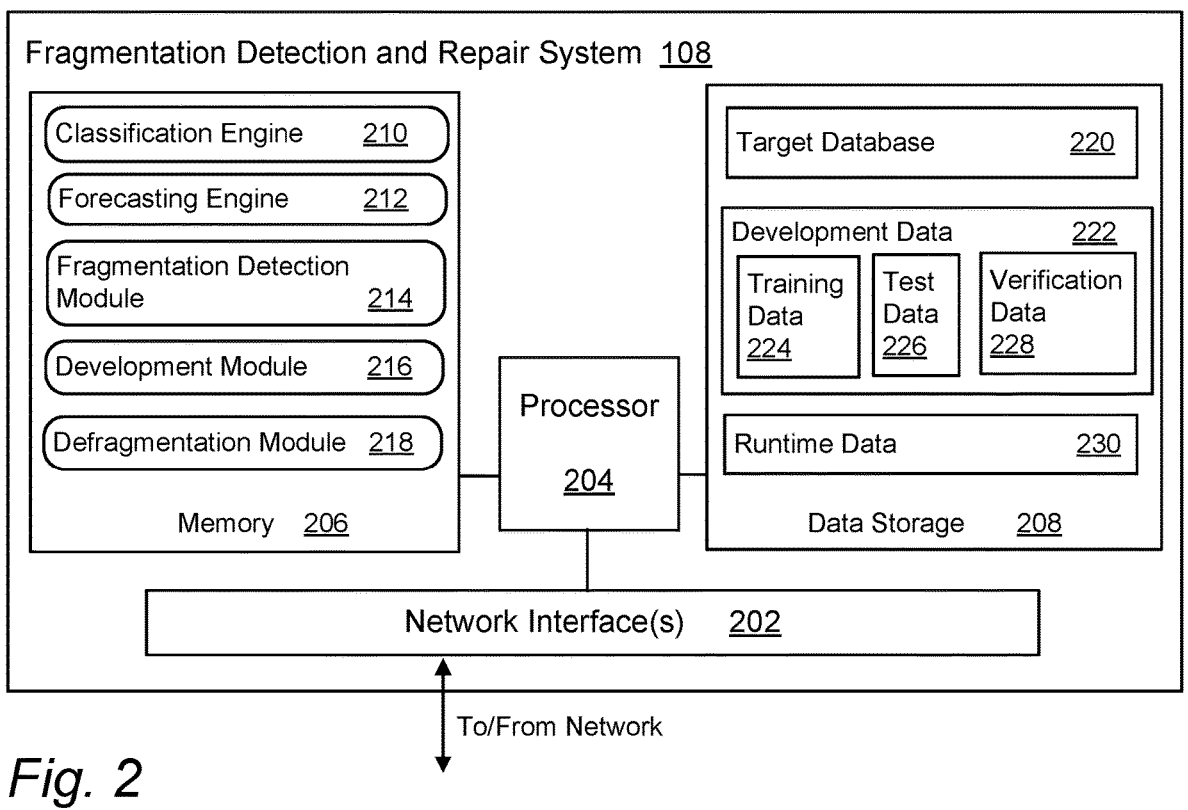
FIG. 2 is a simplified block diagram illustrating certain components of an embodiment of an information handling system configured as a fragmentation detection and repair system, in accordance with an embodiment of the present disclosure.

A block diagram illustrating certain components of an embodiment of fragmentation detection and repair system 108 is shown in FIG. 2. Although illustrated as a single device in FIG. 2, the fragmentation detection and repair system disclosed herein may also be implemented as a server system similar to server system 110 of FIG. 1. In an alternative embodiment, the fragmentation detection and repair system is implemented within a database server such as database server 118 of FIG. 1, where the database server houses one or more target databases for the fragmentation and repair system. Although a single target database 220 is illustrated in the embodiment of FIG. 2, a fragmentation detection and repair system as described herein can operate on multiple databases. In the embodiment of FIG. 2, fragmentation detection and repair system 108 includes one or more network interfaces 202, a processor 204, memory 206 and data storage 208. Memory 206 stores program instructions that when executed by processor 204 implement a classification engine 210, a forecasting engine 212, a fragmentation detection module 214, a development module 216 and a defragmentation module 218. Data storage 208 is configured to store target database 220, development data 222 and runtime data 230.

Network interface 202 is configured for both sending and receiving of data and control information within a network. In an embodiment, network interface 202 comprises multiple interfaces and can accommodate multiple communications protocols and control protocols. Memory 206 includes a plurality of memory locations addressable by processor 204 for storing program instructions and data used in program execution. As such, memory 206 may be implemented using any combination of volatile or non-volatile memory, including random-access memory (RAM) and read-only memory (ROM). In an embodiment, memory 206 is system memory for processor 204. Data storage 208 includes one or more integrated or peripheral mass storage devices, such as magnetic disks, optical disks, solid state drives or flash drives. In other embodiments, or at other times during operation of the embodiment of FIG. 2, some or all of the instructions shown in memory 206 may be stored in data storage 208, and some or all of the data shown in data storage 208 may be stored in memory 206.

Classification engine 210 is configured to classify data obtained during operation of target database 220. This data forms a portion of runtime data 230 and, as discussed further in connection with FIG. 3 below, includes log data from target database 220. Classification engine 210 implements a machine learning classification model that is developed using development data 222. In the embodiment of FIG. 2, development data 222 includes data for multiple stages of machine learning model development, including training data 224, test data 226 and verification data 228. The machine learning classification model implemented by classification engine 210 in system 108 is a supervised learning model. In an embodiment, the machine learning model is a linear support vector machine. Other supervised learning models, including, for example, random forest, decision tree or K nearest neighbor models, can also be used in other embodiments.

Forecasting engine 212 is configured to predict a future time of low relative database utilization from an input set of utilization metric values for target database 220. The set of utilization metric values forms a portion of runtime data 230, and includes values of a utilization metric for a series of recent time intervals, as discussed further in connection with FIG. 3 below. Forecasting engine 212 implements a machine learning time series forecasting model. In an embodiment, the time series forecasting model is a supervised learning model employing a regression algorithm. Such algorithms include, for example, linear regression, support vector regression and regression tree algorithms. In some embodiments, the time series forecasting model employs time-related features such as trends and seasonality, in a manner that will be understood by one of ordinary skill in the art of time series forecasting in view of this disclosure.

Fragmentation detection module 214 is configured to use classification engine 210 to detect database fragmentation. Development module 216 is configured to use development data 222 in developing the machine learning models implemented by classification engine 210 and forecasting engine 212, as discussed further in connection with FIG. 3 below. Defragmentation module 218 is configured to carry out a defragmentation process on targeted database 220 at a time of low relative database utilization predicted by forecasting engine 212.

Further alternatives and variations will be apparent to one of ordinary skill in the art in view of this disclosure. For example, some or all of the modules depicted within memory 206 may be implemented using separate servers as part of a server system like system 110 of FIG. 1. Data depicted within data storage 208 may also be associated with one or more separate servers. Software modules and engines described herein may take various forms understood to one of ordinary skill in the art in view of this disclosure. A single module or engine described herein may in some embodiments be implemented by a combination of multiple files or programs. Alternatively or in addition, one or more functions associated with modules or engines delineated separately herein may be combined into a single file or program.

For ease of discussion, a device or module may be referred to as, for example, "performing," "accomplishing," or "carrying out" a function or process. The unit may be implemented in hardware and/or software. However, as will be evident to one skilled in the art, such performance can be technically accomplished by one or more hardware processors, software, or other program code executed by the processor, as may be appropriate to the given implementation. The program execution could, in such implementations, thus cause the processor to perform the tasks or steps instructed by the software to accomplish the desired functionality or result. However, for the sake of convenience, in the discussion below, a processor or software component may be interchangeably considered as an "actor" performing the task or action described, without technically dissecting the underlying software execution mechanism.

Figure 3:
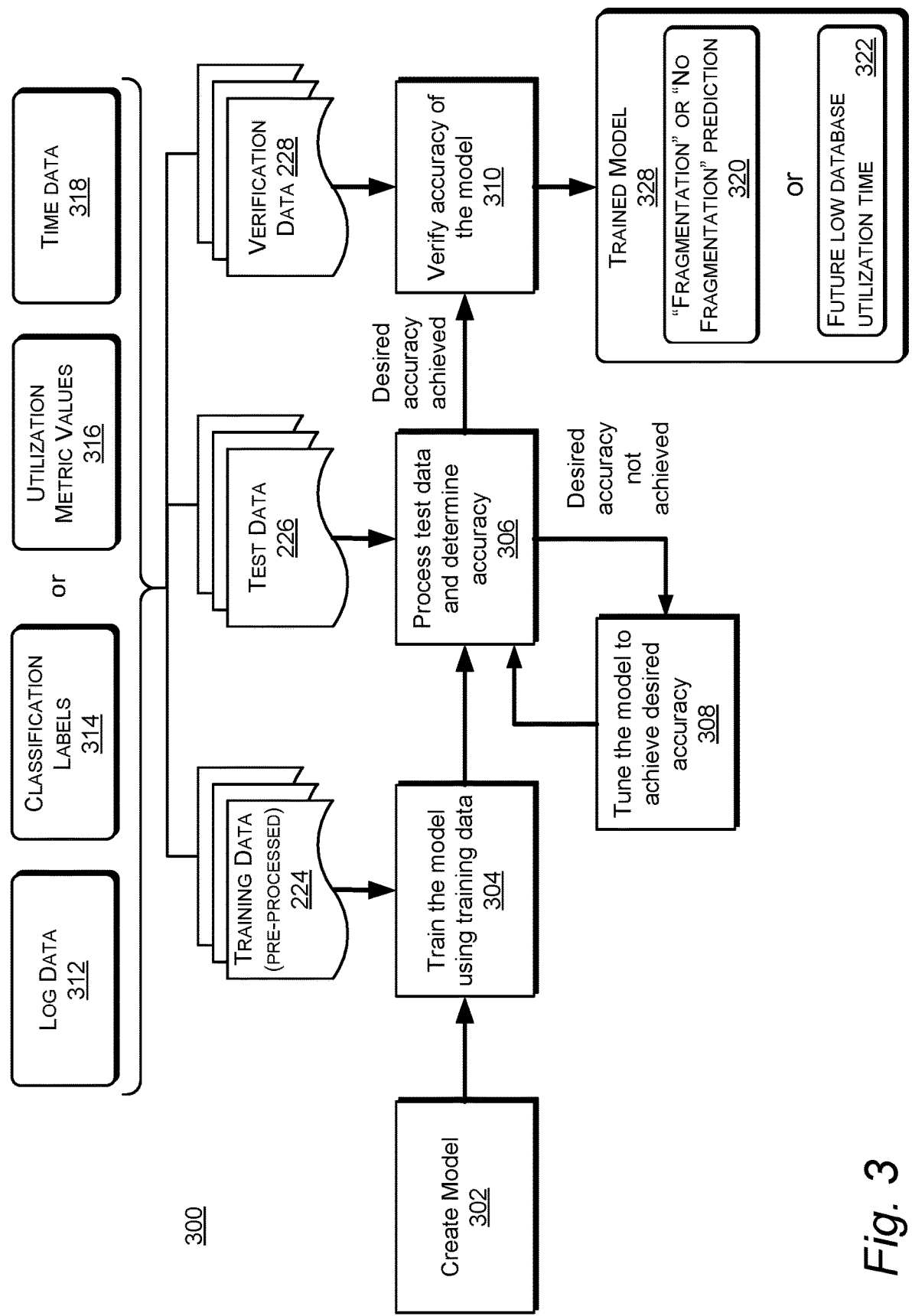
FIG. 3 is a process flow diagram illustrating certain aspects of an embodiment of a development process for a machine learning model, in accordance with an embodiment of the present disclosure.

A process flow diagram illustrating certain aspects of development of a supervised machine learning model is shown in FIG. 3. Steps in process 300 have reference numbers 302 through 310, while various forms and types of data used in process 300 have reference numbers 224 through 228 and 312 through 318. A trained model resulting from process 300 has reference number 328. Process 300 is an embodiment of a process that may be used to develop the machine learning models implemented by classification engine 210 and forecasting engine 212 of FIG. 2. In an embodiment, process 300 is carried out by a development module such as development module 216 of FIG. 2.

Process 300 begins at step 302 with creation of the machine learning model to be developed. In an embodiment, software instructions that implement one or more machine learning algorithms are written to create the model. In the case of the model implemented by classification engine 210 a classification model is created, while in the case of the model implemented by forecasting engine 212 a time series forecasting model is created. In an embodiment, the time series forecasting model employs a regression algorithm rather than a classification algorithm.

At step 304, the machine learning model is trained using pre-processed training data 224, which forms part of development data 222 of FIG. 2. In the embodiment of FIG. 3, training data 224 has been pre-processed, where the processing includes a determination of the appropriate output to be delivered by the trained model in response to input data within the training data. The nature of training data 224 depends on whether the machine learning model being developed is a classification model implemented by classification engine 210 or a time series forecasting model implemented by forecasting engine 212. Each of these models is considered in turn below.

In an embodiment of a classification model implemented by classification engine 210, training data 224 includes log data 312 and classification labels 314. Log data 312 is data of a type matching data available from one or more logs of a target database during its normal operation. In this way, runtime data 230 used by the trained model is the same type of data as the data the model is trained on. "Log" is used herein in the general sense of a record of computer activity. A log is in some embodiments a transaction or event log, storing a history of actions executed by a database management system. This type of log may allow a sequence of operations to be "undone" or "rolled back" for recovery from an error or system crash, or may provide an "audit trail" for analyzing database activity. An example of such a log in Oracle® databases is the "redo log." "Log data" as used herein also includes data from data structures providing statistics over a period of time on cumulative operations in the database. Examples of such statistical log data in Oracle® databases include the V$SQL and V$SQLAREA tables. These tables include statistics on a shared memory area used to store database operation statements that are frequently used. Quantities that may be accessed in these statistical tables include, as just a small sample: elapsed time for handling an SQL statement, CPU time for handling a statement, number of executions of a statement, number of fetches associated with a statement, number of direct writes associated with a statement, and rows processed on behalf of a statement.

Logs and statistical log tables in databases typically contain copious amounts of data. In some embodiments, a portion of the log data is selected for analysis by the training model. For example, certain fields within an Oracle® V$SQL or V$SQLAREA table may be selected. In an embodiment, selection of log data portions to be analyzed is performed by a human. In other embodiments, computer algorithms for identifying the most relevant portions, such as clustering algorithms, may be used instead of or in addition to manual selection. Selection of a portion of log data for analysis may include combining portions of multiple logs or statistical log tables. A specific instance of a portion of log data for analysis by a machine learning model may be referred to herein as a "log data configuration." Analysis of a log data configuration by the machine learning classification model implemented by classification engine 210 results in a prediction by the classification model, in the form of selection of a classification label value best corresponding to the log data configuration. In an embodiment, a collection of training data 224 for the classification model includes multiple log data configurations, with each log data configuration associated with a corresponding classification label 314.

Classification labels 314 represent the output to be delivered by the machine learning classification model implemented by classification engine 210. In an embodiment, there are two classification labels used: one indicating fragmentation in the database, and one indicating a lack of fragmentation. These labels are represented as "fragmentation" and "no fragmentation" in output 320 of trained model 328, but the specific text of the labels can of course vary. The two labels in this embodiment can have any form sufficient to indicate to the fragmentation detection and repair system that a defragmentation process should be scheduled in response to one of the labels, while a defragmentation process should not be scheduled in response to the other label. In an alternative embodiment, more than two classification labels may be used to provide additional information to the fragmentation detection and repair system. For example, additional classification labels may be used in some embodiments to indicate different types of fragmentation, such as table fragmentation or index fragmentation.

For the machine-learning classification model implemented by classification engine 210, training step 304 of process 300 includes running the machine learning model's algorithm on the paired log data configurations and classification labels within training data 224. The operation of the machine learning algorithm produces a trained function for mapping log data configurations to classification labels.

In an embodiment of a time series forecasting model implemented by forecasting engine 212, training data 224 includes utilization metric values 316 and time data 318. Utilization metric values 316 are values of a quantity related to utilization of the target database. In an embodiment, a utilization metric can be defined relating to the number of active sessions with the target database, where a session is a connection of an application to the database. For example, a utilization metric could be a maximum, or peak, number of active sessions in a waiting state, during some interval of time, because a number of sessions having to wait should relate to a degree of utilization of the database. In another embodiment, a utilization metric is defined relating to a number of error messages issued during some interval of time, where the error messages involve a failure to complete a database transaction, because a number of failed transactions can relate to a degree of utilization of the database. Suitable utilization metrics may depend on the specific configuration and usage of the target database, as will be understood by one of ordinary skill in the art of database administration in view of this disclosure.

Time data 318 is associated with utilization metric values 316 so that each utilization metric value is paired with a corresponding time interval. In an embodiment, the time intervals are one-hour intervals. In other embodiments, the time intervals can be of other lengths, or can be narrowed to the point of being discrete time stamp values. Training data 224 for the machine learning time series forecasting model includes one or more sets of multiple utilization metric values 316, each set arranged in a time series using corresponding values of time data 318. Although illustrated separately from utilization metric values 316 as a way of emphasizing the time-dependent nature of data for the forecasting model, values of time data 318 are paired with corresponding utilization metric values.

In an embodiment, the output of a time series forecasting model is one or more future values of the time-dependent quantity represented in the model's training data. Pre-processed training data can therefore include earlier values of a time series as the input with later values of the same series as the corresponding output to be achieved. In a further embodiment, the output of a model is a value obtained by analysis of predicted future time series values, such as a minimum or maximum value predicted over a given future time range. In such an embodiment, training data 224 may include a minimum value, over a time series range subsequent to that of a set of training data associated with the minimum value, of the utilization metric. For example, if the utilization metric is number of database transactions carried out during a one-hour period, and a set of training data is a series covering a 48-hour period, the hour within a subsequent 24-hour period in which the number of database transactions carried out is the lowest could be included in the training data as a desired output of the time series forecasting model for this set of training data.

At step 306 of process 300 in FIG. 3, the model is used to process test data 226. In the embodiment of FIG. 3, test data 226 is pre-processed data of the same form as training data 224, such as a portion of the training data set aside for use as test data. The output of the model is compared to the expected output for determination of an accuracy of the test data processing. In an embodiment, the accuracy is defined in terms of a percentage of data sets classified correctly, in the case of a classification model, or an allowed deviation from the expected answer in the case of a regression model seeking a numerical answer. If the desired accuracy is not achieved, the model is tuned, at step 308. Tuning of the model may involve, for example, modification of parameters of the machine learning algorithm used, or switching to a different algorithm if necessary. In an embodiment, steps 306 and 308 are iterated until the desired accuracy is achieved.

A final step in process 300 is verification step 310. After the desired accuracy of processing test data 226 has been achieved, the accuracy of the model is verified using verification data 228. In an embodiment, verification step 310 is performed to determine whether the model exhibits any bias toward training data 224 or test data 226. Verification data 228 is of the same form as, but distinct from, training data 224 and test data 226. After verification of the accuracy of the model using the verification data, trained model 328 can be used to implement classification engine 210 or forecast engine 212 (using an appropriate model). In the case of a classification model for implementing classification engine 210, output of trained model 328 is a prediction 320 of either fragmentation or lack of fragmentation. In the case of a time series forecasting model for implementing forecasting engine 212, the ultimate output of trained model 328 is a future time of low database utilization (within some range of future time).

Further alternatives and variations to the machine learning model development process of FIG. 3 will be apparent to one of ordinary skill in the art of machine learning in view of this disclosure. For example, verification data 228 can also be referred to as "validation data." Moreover, data having the function of test data 226 is sometimes referred to in the art as "validation data," with step 306 referred to as a validation step. Similarly, data having the function of verification data 228 is sometimes referred to in the art as "test data," with step 310 referred to as a testing step.

In some embodiments, different development processes than that of FIG. 3 may be employed. For example, as an alternative to steps 306 and 308, a k-fold cross-validation method may be used in which the combined training and test/validation data is divided into k subsets. Training and validation steps are then carried out k times, with a different one of the subsets held out for use as validation data each time. In some embodiments, an information criteria analysis, such as minimization of Akaike's Information Criterion (AIC), may be used for model tuning rather than the test data processing of step 306. Information criteria analysis may particularly be used in development of time series forecasting models for which less validation/test data may be available. As will be understood by one of ordinary skill in the art, careful selection of test/validation or verification data sets can help to avoid bias or "data leakage" in some embodiments.

In some embodiments, development data 222 of FIG. 2 is not retained by fragmentation detection and repair system 108 after the machine learning models implemented by classification engine 210 and forecasting engine 212 are trained. In other embodiments, the development data is retained and updated with newer development data over time. Tuning or retraining of a model may be performed periodically or as needed in such an embodiment.

Embodiments of a fragmentation detection and repair system described herein are believed to address problems resulting from fragmentation in databases. Depending on the type of fragmentation and the operations performed in the database, severe performance degradation can occur. As one example, the Oracle® database management system defines a "high water mark" (HWM) as the boundary between data blocks that have ever had data written to them, and those that have not. Even when data is deleted from used blocks, the position of the HWM is maintained. Certain operations, such as table scans, involve reading all blocks below the HWM. Fragmentation causing significant numbers of empty blocks below the HWM can result in significant slowing of database operations.

When performance problems occur with a database, an administrator typically performs database queries to confirm that fragmentation exists and determine which tables or indexes are affected. Because the fragmentation is significant enough to cause performance issues, defragmentation is likely to involve an extensive process that necessitates taking the database offline. It may therefore be necessary to wait until the next scheduled maintenance window to perform the defragmentation; meanwhile, database performance may continue to degrade.

The performance degradation associated with fragmentation would be reduced if fragmentation could be detected before it progresses to the point of affecting performance. Database management systems are configured to allow fragmentation to be detected using database queries. The frequent use of such queries in an attempt to detect fragmentation early can cause its own problems, however. The queries themselves can cause loading of the database and degrade its performance. The methods and systems disclosed herein employ machine learning to detect fragmentation in a database using log data. This approach does not cause the same database loading as query-based detection. Upon detecting fragmentation in the database, embodiments of the disclosed fragmentation and repair method use a machine learning model to predict an upcoming time interval of low database utilization, and schedule a defragmentation procedure for performance during that time interval. In an embodiment, the fragmentation is detected at a relatively early stage. The limited extent of the fragmentation, along with the low relative database utilization at the time of the defragmentation, increase the likelihood that defragmentation can be performed without taking the database offline.

Figure 4:
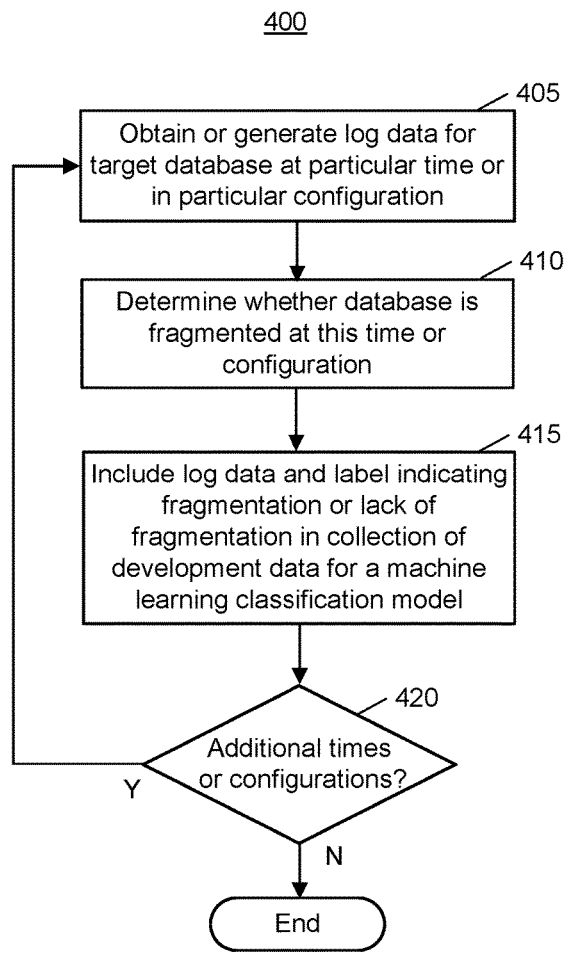
FIG. 4 is a flow chart illustrating certain aspects of an embodiment of a method for generating development data for a machine learning classification model, in accordance with an embodiment of the present disclosure.

A flow chart illustrating an embodiment of a method for generating development data for a machine learning classification model is shown in FIG. 4. Method 400 of FIG. 4 can be used to generate a portion of development data 222 shown in FIG. 2. This development data is used in development of a machine learning classification model to implement classification engine 210 of FIG. 2, using a process such as process 300 of FIG. 3. The development data is therefore data suitable for training the classification model to predict whether a log data configuration for a database corresponds to fragmentation in the database. Method 400 begins at step 405 with obtaining or generating log data for the target database, where the log data corresponds to a particular time or a particular configuration of the database. This log data corresponds to log data 312 of FIG. 3. As described further above in connection with FIG. 3, the log data can be obtained from one or more transaction logs or statistical logs available for the target database. In an embodiment, step 405 includes selection of portions of available log data to be included within development data 222. This selection can be performed manually, by a computer algorithm, or manually with assistance of a computer algorithm. In the case of log data stored in a non-human-readable form, step 405 may also include translation or "mining" of such log data to obtain relevant portions.

In an embodiment, step 405 includes obtaining log data generated during normal operation, or a "production" state, of the database. Instead of or in addition to obtaining log data generated during normal operation, step 405 may include obtaining log data generated during operation of the database in a testing or development mode. In an embodiment, obtaining log data generated in a testing or development mode includes inducing a particular database configuration, either manually or through use of computer scripts. As used in FIG. 4, a database configuration refers to a distribution of data with respect to the fundamental storage units used by the database. In some embodiments, log data believed to correspond to a relevant database configuration is simulated as part of step 405. An instance of log data obtained or generated in step 405 may be referred to herein as a log data configuration.

Method 400 continues in step 410 with determining whether the database configuration represented by the log data configuration resulting from step 405 is to be considered fragmented. More particularly, step 410 is a determination of whether a defragmentation process should be scheduled in response to the database configuration represented by this log data configuration. In an embodiment, step 410 includes a determination of whether any fragmentation is of a type likely to cause performance problems if allowed to continue. Such a determination is made, in some embodiments, by a database administrator familiar with the behavior of the targeted database. In a further embodiment, experimentation with or simulation of database performance in response to particular types of fragmentation is employed in making the determination of step 410.

Pursuant to the determination in step 410, a classification label indicating fragmentation or the lack thereof is assigned to the log data configuration in step 415. The log data configuration and the corresponding classification label are included in a collection of development data for the machine learning classification model. In an embodiment, step 415 further includes designating the log data configuration and its corresponding identification label as a particular type of development data, including, for example, training data such as data 224, test/validation data such as data 226 or verification/test data such as data 228. In other embodiments, any sorting of development data into different types is performed after a larger set of data is assembled. If development data corresponding to additional times or database configurations is desired (decision step 420), steps 405 through 415 are repeated, until a suitable set of data for model development is obtained. In some embodiments, an additional step of splitting the development data into subsets for particular development stages (e.g., training, test, verification) is included in process 400 after the "no" branch of decision step 420.

Figure 5:
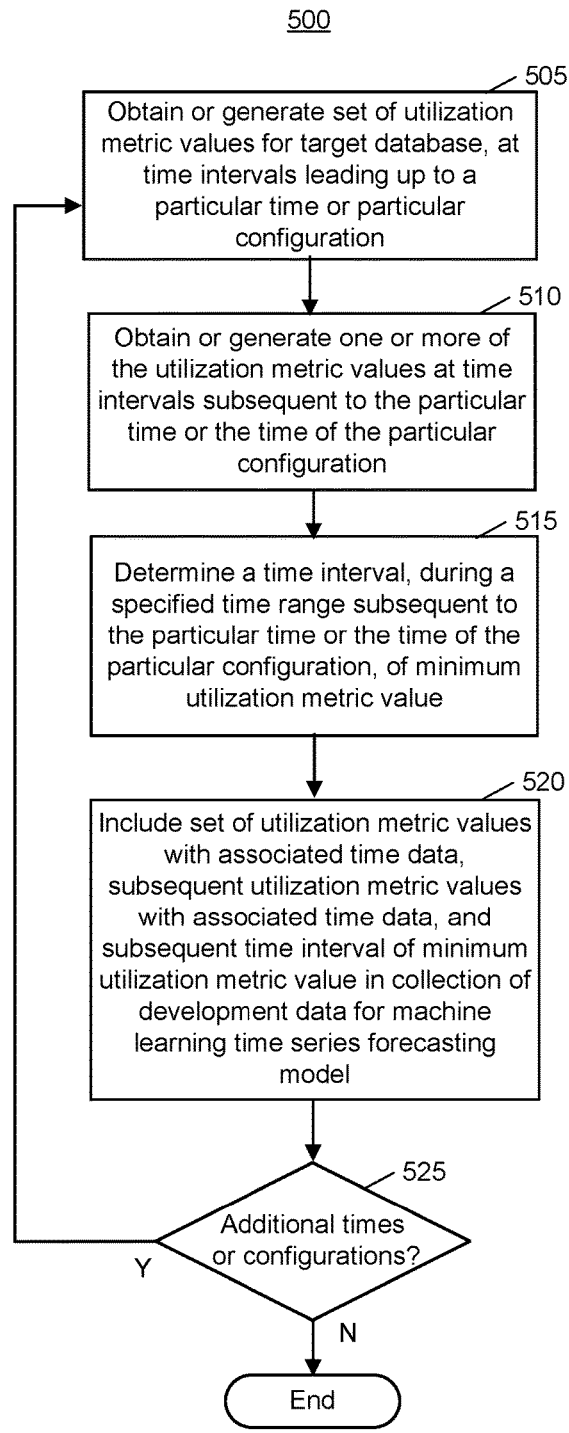
FIG. 5 is a flow chart illustrating certain aspects of an embodiment of a method for generating development data for a machine learning time series forecasting model, in accordance with an embodiment of the present disclosure.

A flow chart illustrating an embodiment of a method for generating development data for a machine learning time series forecasting model is shown in FIG. 5. Method 500 of FIG. 5 can be used to generate a portion of development data 222 shown in FIG. 2. This development data is used in development of a machine learning classification model to implement forecasting engine 212 of FIG. 2, using a process such as process 300 of FIG. 3. The development data is therefore data suitable for training the time series forecasting model to predict a future time of low database utilization, based on earlier time series data for a quantity related to database utilization.

Method 500 begins at step 505 with obtaining or generating a set of utilization metric values for the target database, at time intervals leading up to a particular time or to a time corresponding to a particular database configuration. These utilization metric values correspond to utilization metric values 316 of FIG. 3, in combination with time data 318 of FIG. 3. As discussed further above in connection with FIG. 3, the set of utilization metric values forms a time series of the value of some quantity related to database utilization. An example of a set of utilization values is a series of values of the maximum number of active sessions in a database during a one-hour period, with a value provided for each hour. Because the time series forecasting model uses past time series values to predict future values, the set of utilization metric values is at time intervals leading up to a particular time. Predictions by the model based on this set of utilization metric values will involve times subsequent to the particular time. In some embodiments, the particular time is chosen as the time corresponding to a particular configuration of the database, where a database configuration refers to a distribution of data with respect to the fundamental storage units used by the database. In a manner similar to that described above in connection with log data for development of a classification model, the utilization metric values can be obtained during various modes of database operation, or can be simulated.

Method 500 continues in step 510 with obtaining or generating one or more of the utilization metric values corresponding to time intervals subsequent to the particular time or the time of the particular configuration. The utilization metric values obtained in step 510 are values of the same utilization metric obtained in step 505, with the values obtained in step 510 corresponding to time intervals subsequent to the particular time defined in step 505. The values obtained in step 510 are therefore a form of desired output values for the time series forecasting model, based on using the set of utilization metric values obtained in step 505 as input values to the model. In an embodiment, a long time series of utilization metric values is split into multiple shorter time series associated with separate time reference values. One or more values from each of the shorter time series (except for the earliest series) can be designated as output values for the preceding time series.

Step 515 of method 500 includes determining a time interval, during a specified time range subsequent to the particular time defined in step 505, corresponding to a minimum utilization metric value within the specified time range. This time interval having minimum utilization metric value is another form of desired output value for the time series forecasting value. A time interval having a minimum utilization metric value during a time range is a time interval of low relative database utilization during that time range. Such a time interval is therefore a suitable time for scheduling of a defragmentation procedure while the database remains online. As an example, consider an embodiment in which a set of utilization metric values obtained in step 505 is a time series of hourly values of the maximum number of active database sessions during that hour, where the time series values lead up to a particular time of 9 am on Apr. 15, 2019. For a specified time range of 24 hours, the time interval determined in step 515 would be the one-hour interval between 9 am on April 15 and 9 am on April 16 for which the maximum number of active database sessions is the lowest.

Method 500 continues at step 520 with including, in a collection of development data for the time series forecasting model, the set of utilization metric values obtained in step 505 with associated time data, the subsequent utilization metric values obtained in step 510 with associated time data, and the subsequent time interval of minimum utilization metric value obtained in step 515. The subsequent utilization metric values obtained in step 510 and the time interval value determined in step 515 are designated as outputs corresponding to the set of utilization metric values determined in step 505, which is designated as input data. If time series data for the utilization metric with respect to additional times or configurations is desired (and available), steps 505 through 520 are repeated.

In the embodiment of FIG. 5, two types of output data are associated with a set of input data: subsequent time series values and a minimum time series value for a specified subsequent range. In other embodiments, only one of these output data types is obtained and associated with the input data to form model development data. In some embodiments, for example, only subsequent time series values are used as output data, since a minimum time series value can be determined using additional processing by a model trained to predict subsequent time series values. In these embodiments step 515 of method 500 would be omitted and, in step 520, only the subsequent utilization metric values would be included with the set of utilization metric values in the collection of development data. In other embodiments, only the minimum time series value for one or more specified subsequent ranges is used as output data. In these embodiments step 510 of method 500 would be omitted and, in step 520, only the subsequent time interval of minimum utilization metric value would be included with the set of utilization metric values in the collection of development data. In a manner similar to that described above for development data in FIG. 4, method 500 may in some embodiments include an additional step of splitting the development data into subsets for particular development stages, such as training, test, and verification.

Figure 6:
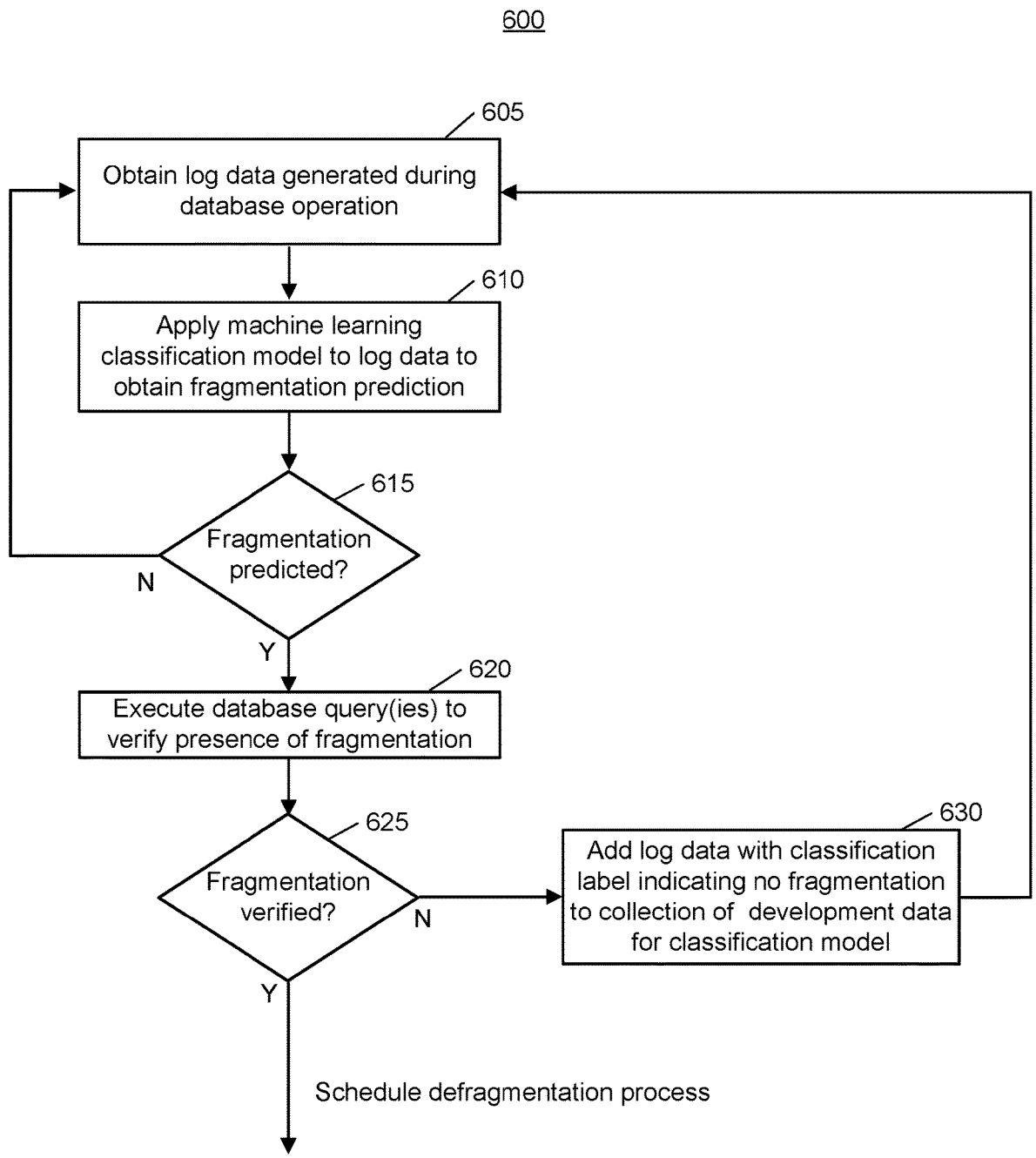
FIG. 6 is a flow chart illustrating certain aspects of an embodiment of a method for detecting database fragmentation, in accordance with an embodiment of the present disclosure.

A flow chart illustrating an embodiment of a method for detecting database fragmentation is shown in FIG. 6. In an embodiment, method 600 of FIG. 6 is carried out by a fragmentation detection module such as module 214 of FIG. 2. Method 600 begins at step 605 with obtaining log data generated during database operation. The log data obtained in step 605 is of similar form to the log data obtained or generated in step 405 of FIG. 4. In step 610 of method 600, a machine learning classification model is applied to the log data to obtain a fragmentation prediction. The machine learning classification model is described above in connection with classification engine 210 of FIG. 2 and with FIGS. 3 and 4. The fragmentation prediction is received from the machine learning classification model in the form of a classification label mapped by the model to the log data.

If the prediction indicates a lack of fragmentation, or that there is no current need to schedule defragmentation ("no" branch of decision step 615), method 600 returns to repeat steps 605 and 610. In an embodiment, repetition of steps 605 and 610 is not performed immediately. Instead, steps 605 and 610 may be performed after some interval of time (such as five minutes) in some embodiments, until a prediction of fragmentation is received. In another embodiment, the start of method 600 may be triggered by an event in the database, such as execution of a particular instruction or type of instruction, or reaching of a certain number of executions of a particular instruction or type of instruction. The specific type of trigger used in such an embodiment may depend on details of the target database.

When the prediction indicates the presence of fragmentation, or that defragmentation should be scheduled ("yes" branch of decision step 615), method 600 continues in step 620 with executing one or more database queries to verify the presence of fragmentation. If the presence of fragmentation is verified ("yes" branch of decision step 625), the method moves on to scheduling of a defragmentation process, which is discussed further in connection with FIG. 7 below. If the presence of fragmentation is not verified ("no" branch of step 625), the log data analyzed by the machine learning classification model, along with a classification label indicating the lack of fragmentation, is added at step 630 to a collection of development data for the classification model. The updated development data is then available for use in tuning or retraining the classification model. After updating the collection of development data in step 630, method 600 returns to step 605.

In the embodiment of FIG. 6, a prediction by the machine learning classification model that fragmentation exists is verified using database queries before proceeding to schedule a defragmentation process. This verification is optional, and can be omitted in other embodiments of a fragmentation detection method disclosed herein. In such an embodiment, a prediction from the model indicating fragmentation ("yes" branch of step 615) would lead directly to scheduling of a defragmentation process.

Figure 7:
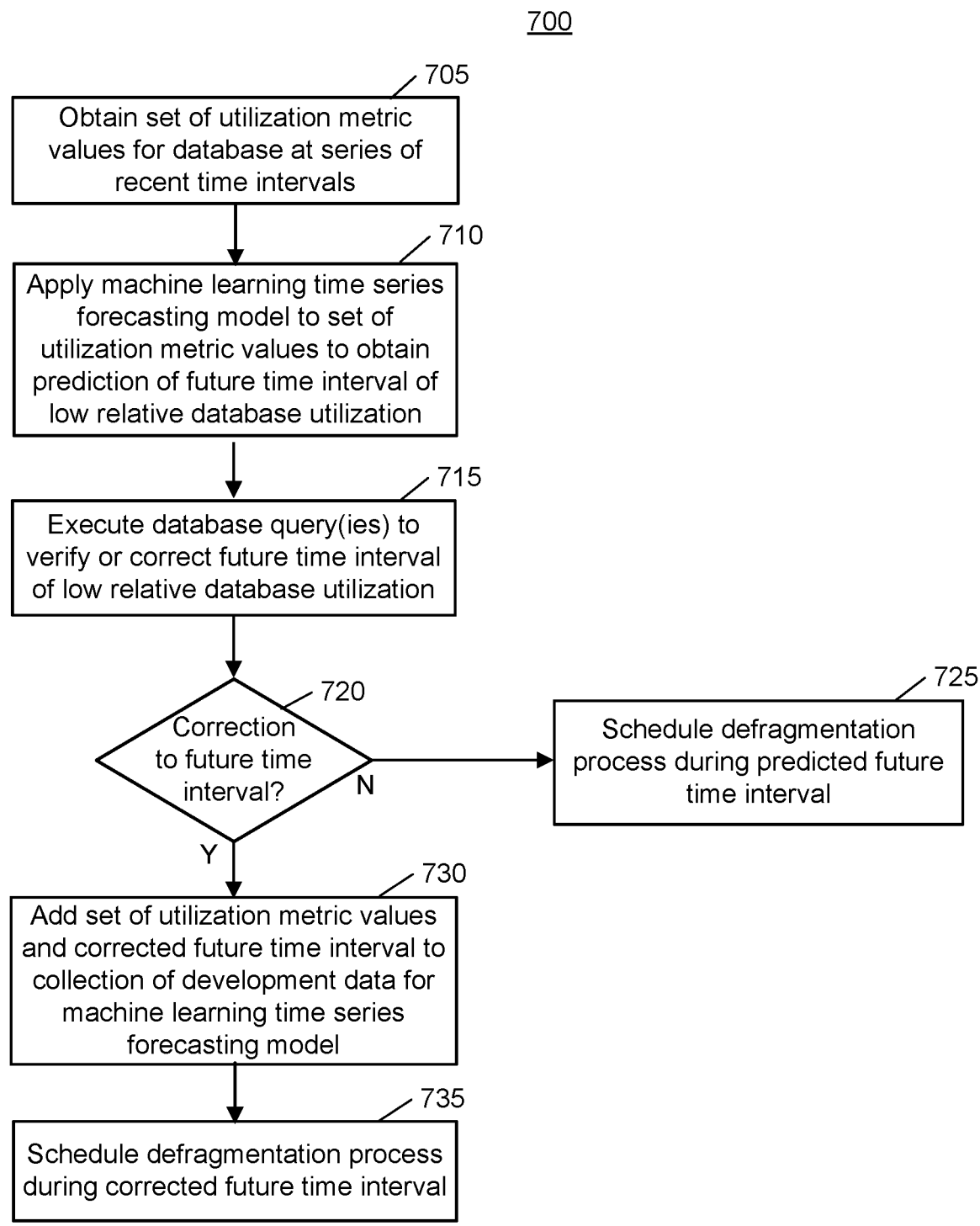
FIG. 7 is a flow chart illustrating certain aspects of an embodiment of a method for scheduling database defragmentation, in accordance with an embodiment of the present disclosure.

A flow chart illustrating an embodiment of a method for scheduling database defragmentation is shown in FIG. 7. In an embodiment, method 700 of FIG. 7 is carried out by a fragmentation detection module such as module 214 of FIG. 2 or a defragmentation module such as module 218 of FIG. 2. In the embodiment of FIG. 7, method 700 begins at step 705 with obtaining a set of utilization metric values for the target database, where the values are at a series of recent time intervals (recent with respect to the time that method 700 is carried out). The utilization metric values obtained in step 705 of FIG. 7 are similar in form to those obtained in step 505 of FIG. 5. In step 710 of method 700, a machine learning time series forecasting model is applied to the set of utilization metric values to obtain a prediction of a future time interval of low relative database utilization. The machine learning time series forecasting model is described above in connection with forecasting engine 212 of FIG. 2 and with FIGS. 3 and 5.

Method 700 continues in step 715 with execution of one or more database queries to verify or correct the future time interval of low relative database utilization. If the query execution results in a correction of the future time interval ("yes" branch of decision step 720), the set of utilization metric values analyzed by the time series forecasting model, along with the corrected future time interval, is added, at step 730, to a collection of development data for the time series forecasting model. The updated development data is then available for use in tuning or retraining the time series forecasting model. A defragmentation process is then scheduled, at step 735, to be performed during the corrected future time interval. If the query execution of step 715 results in a verification of the predicted future time interval (by not resulting in a correction to the future time interval), a defragmentation process is scheduled, at step 725, during the predicted future time interval.

Further alternatives and variations to the defragmentation scheduling method of FIG. 7 will be apparent to one of ordinary skill in the art in view of this disclosure. For example, the future time interval of low relative database utilization predicted by the time series forecasting model is verified by executing database queries in the embodiment of FIG. 7. This verification is optional, and can be omitted in other embodiments. As another example, method 700 begins with obtaining, at step 705, a set of utilization metric values for the target database at a series of recent time intervals. In some embodiments this step is omitted, and the time series forecasting model is configured to forecast future time series values based on its training using earlier time series values. In databases for which utilization as a function of time follows stable patterns, obtaining more recent time series data may not be necessary for an accurate prediction of a future time of low relative database utilization. As still another example, if the verification procedure within method 700 results in a correction to the predicted future time interval of low relative database utilization, the corrected future time interval is added to the collection of development data for the time series forecasting model, along with the analyzed set of utilization metric values. This reflects an embodiment in which development data for the time series forecasting model includes the future time interval along with the set of utilization metric values. As discussed further above in connection with FIG. 5, the future time interval is not included in the development data in some embodiments of the time series forecasting model.

Figure 8:
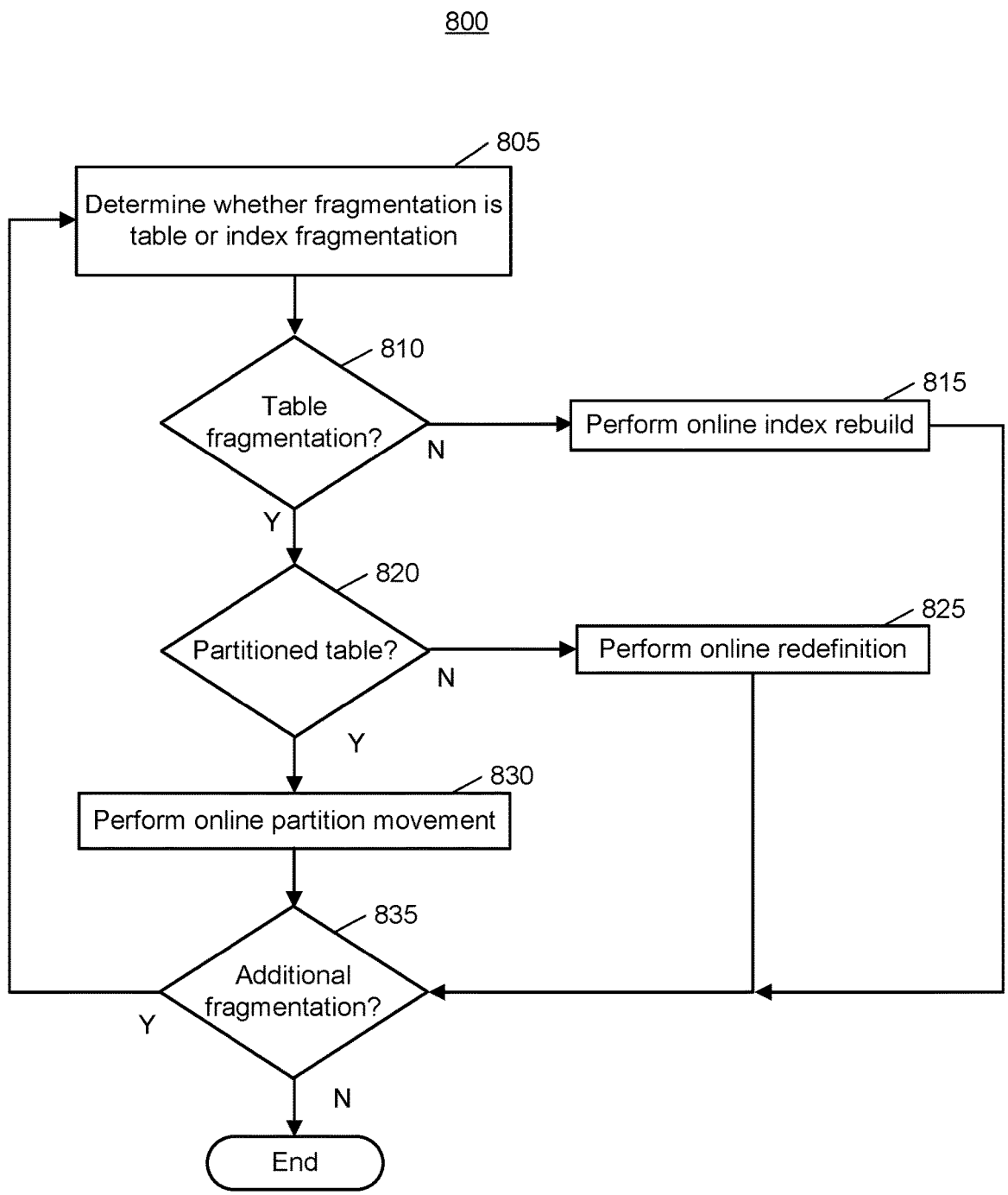
FIG. 8 is a flow chart illustrating certain aspects of an embodiment of a method for performing database defragmentation, in accordance with an embodiment of the present disclosure.

A flow chart illustrating an embodiment of a method for performing database defragmentation is shown in FIG. 8. In an embodiment, method 800 of FIG. 8 is carried out by a defragmentation module such as module 218 of FIG. 2. In the embodiment of FIG. 8, method 800 begins at step 805 with determining whether the fragmentation being repaired is fragmentation of a table or fragmentation of an index. In some embodiments, the determination of step 805 is made using queries to the database. In another embodiment, classification labels used by the classification engine 210 indicate whether a predicted fragmentation is table or index fragmentation. If the fragmentation is index fragmentation ("no" branch of decision step 810, since table and index fragmentation are the two choices), an online rebuild of the index is performed at step 815, in a way understood by one of ordinary skill in the art of database management in view of this disclosure. If the fragmentation being repaired is table fragmentation, a determination is made at decision step 820 whether the fragmented table is partitioned.

If the table is not partitioned, an online redefinition of the table is performed at step 825, in a way understood by one of ordinary skill in the art of database management in view of this disclosure. If the table is partitioned, an online partition movement is performed at step 830, in a way understood by one of ordinary skill in the art of database management in view of this disclosure. If additional fragmentation needs repair ("yes" branch of decision step 835), method 800 returns to step 805. Otherwise, the defragmentation method ends.

In an embodiment, database loading is monitored during the defragmentation processes of steps 815, 825 and 830 of method 800. If excessive database loading is detected in such an embodiment, the defragmentation is suspended. In a further embodiment, suspending the defragmentation leads to a rescheduling of the defragmentation using method 700 of FIG. 7. It is believed that the fragmentation detection and repair disclosed herein make suspension of the defragmentation less likely, however. By allowing detection of fragmentation at an earlier stage, before performance degradation becomes evident, the methods and systems disclosed herein may result in less extensive defragmentation procedures that are more likely to be completed during time periods when database utilization is low, though the database is online. In some embodiments of method 800, actions taken are logged for review by a database administrator. Similar logging occurs in some embodiments of the fragmentation detection and defragmentation scheduling methods disclosed herein.

Other advantages associated with the methods and systems disclosed herein include that fragmentation-based degradation of database performance is avoided and waste of disk space due to fragmentation is avoided. In addition, the disclosed fragmentation detection and repair of a production database does not require human intervention.

Figure 9:
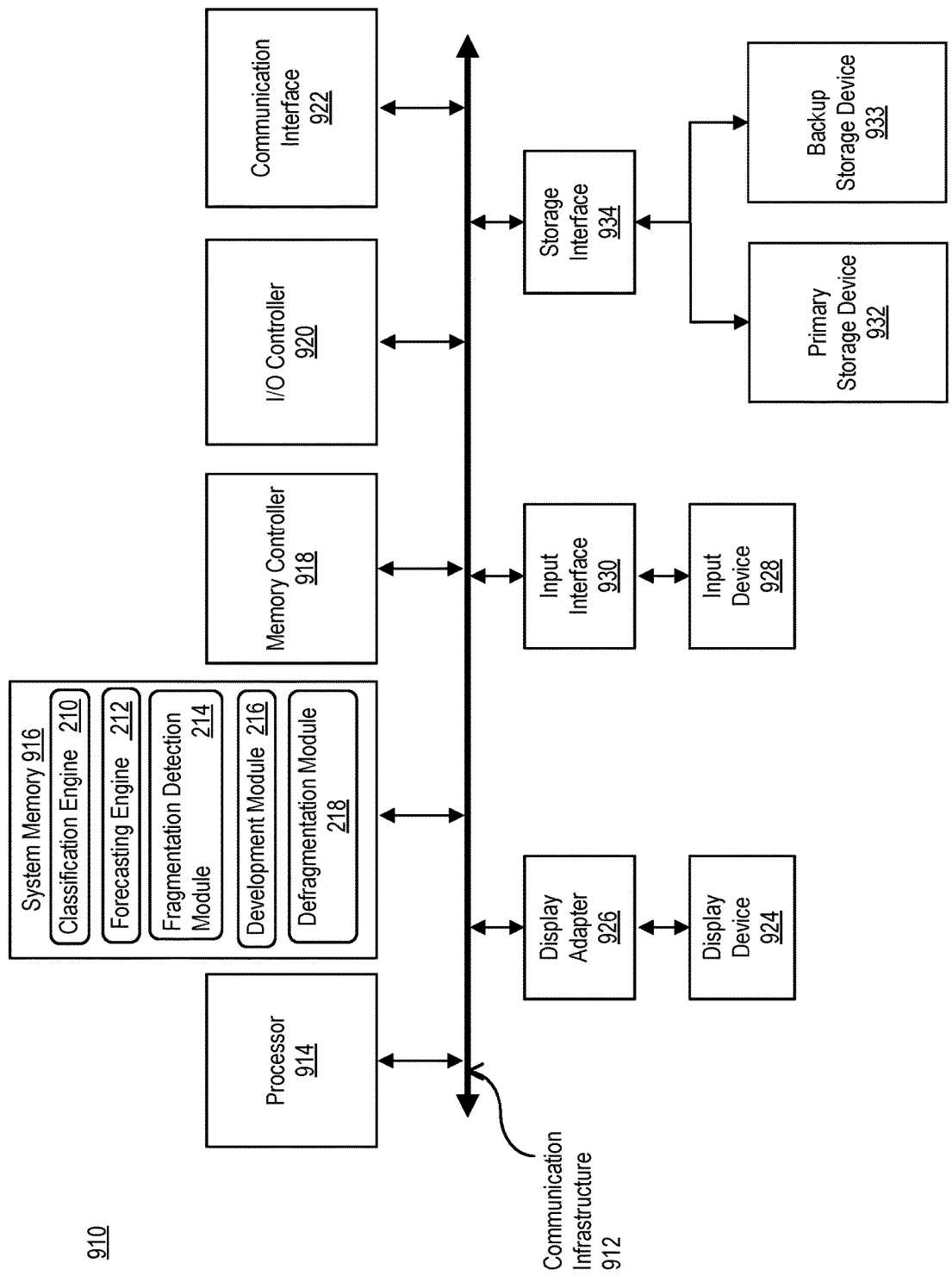
FIG. 9 is a block diagram illustrating an information handling system suitable for implementing aspects of an embodiment of the present disclosure.

FIG. 9 depicts a block diagram of an information handling system 910 suitable for implementing aspects of the systems described herein. In the embodiment of FIG. 9, computing system 910 implements fragmentation detection and repair system 108. Embodiments of the computing system of FIG. 9 can, alternatively or in addition, implement various other engines and modules described in this disclosure. Computing system 910 broadly represents any single or multi-processor computing device or system capable of executing computer-readable instructions. Examples of computing system 910 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 910 may include at least one processor 914 and a system memory 916. By executing the software that implements fragmentation detection and repair system 108, computing system 910 becomes a special purpose computing device that is configured to perform database fragmentation detection and repair in manners described elsewhere in this disclosure.

Processor 914 generally represents any type or form of processing unit capable of processing data or interpreting and executing instructions. In certain embodiments, processor 914 may receive instructions from a software application or module. These instructions may cause processor 914 to perform the functions of one or more of the embodiments described and/or illustrated herein. System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. The ROM or flash memory can contain, among other code, the Basic Input-Output System (BIOS) which controls basic hardware operation such as the interaction with peripheral components. Although not required, in certain embodiments computing system 910 may include both a volatile memory unit (such as, for example, system memory 916) and a non-volatile storage device (such as, for example, primary storage device 932, as described further below). In one example, program instructions executable to implement a classification engine 210, forecasting engine 212, fragmentation detection module 214, development module 216 and defragmentation module 218 may be loaded into system memory 916.

In certain embodiments, computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller 918 may perform and/or be a means for performing, either alone or in combination with other elements, one or more of the operations or features described and/or illustrated herein. I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer) for display on display device 924. Computing system 910 may also include at least one input device 928 coupled to communication infrastructure 912 via an input interface 930. Input device 928 generally represents any type or form of input device capable of providing input, either computer or human generated, to computing system 910. Examples of input device 928 include, without limitation, a keyboard, a pointing device, a speech recognition device, or any other input device.

As illustrated in FIG. 9, computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may include a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910. A storage device like primary storage device 932 can store information such as routing tables and forwarding tables.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may be a part of computing system 910 or may in some embodiments be separate devices accessed through other interface systems. Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9.

Computing system 910 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 910 for storage in memory via a network such as the Internet or upon a carrier medium. The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the embodiments described and/or illustrated herein. Additionally or alternatively, one or more of the embodiments described and/or illustrated herein may be implemented in firmware and/or hardware. For example, computing system 910 may be configured as an application specific integrated circuit (ASIC) adapted to implement one or more of the embodiments disclosed herein.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

Although the present disclosure includes several embodiments, the disclosure is not intended to be limited to the specific forms set forth herein. On the contrary, it is intended to cover such alternatives, modifications, and equivalents as can be reasonably included within the scope defined by the appended claims.

What is claimed is:

1. A method, comprising:
obtaining log data reflecting transactions in a database, wherein the log data is generated during operation of the database;
applying a machine learning classification model to at least a portion of the log data to obtain a first prediction, wherein the first prediction indicates whether defragmentation of the database should be scheduled;
using a machine learning time series forecasting model to obtain a second prediction, wherein the second prediction identifies a future time interval of low relative database utilization; and
scheduling a database defragmentation procedure for performance during the future time interval of low relative database utilization.

2. The method of claim 1, wherein using the machine learning time series forecasting model is performed subsequent to obtaining the first prediction indicating that defragmentation of the database should be performed.

3. The method of claim 1, wherein the first prediction does not indicate that defragmentation should be scheduled, further comprising repeating the obtaining the log data and applying the machine learning classification model.

4. The method of claim 1, wherein the first prediction indicates that defragmentation should be scheduled, further comprising executing one or more queries of the database for verification of the presence of fragmentation.

5. The method of claim 4, wherein verification of the presence of fragmentation is not obtained via executing the one or more queries, further comprising adding the at least a portion of the log data and an indication of a non-fragmented database state to a collection of development data for the machine learning classification model.

6. The method of claim 1, further comprising, subsequent to obtaining the second prediction, executing one or more queries of the database for verification or correction of the future time of low relative database utilization, and wherein scheduling the database defragmentation procedure is performed subsequent to the verification or correction of the future time of low relative database utilization.

7. The method of claim 1, wherein using the machine learning time series forecasting model comprises:
obtaining a set of utilization metric values for the database, wherein the set of utilization metric values comprises values of a utilization metric for a series of time intervals approaching the time of the obtaining the set of utilization metric values; and
applying the machine learning time series forecasting model to at least a portion of the set of utilization metric values.

8. An information handling system comprising:
one or more processors;
a non-transitory computer-readable storage medium coupled to the one or more processors; and
a plurality of instructions, encoded in the computer-readable storage medium and configured to cause the one or more processors to
obtain log data reflecting transactions in a database, wherein the log data is generated during operation of the database,
apply a machine learning classification model to at least a portion of the log data to obtain a first prediction, wherein the first prediction indicates whether defragmentation of the database should be scheduled,
use a machine learning time series forecasting model to obtain a second prediction, wherein the second prediction identifies a future time interval of low relative database utilization, and
schedule a database defragmentation procedure for performance during the future time interval of low relative database utilization.

9. The information handling system of claim 8, wherein the plurality of instructions is further configured to use the machine learning time series forecasting model subsequent to obtaining a first prediction indicating that defragmentation of the database should be performed.

10. The information handling system of claim 8, wherein the plurality of instructions is further configured to, if the first prediction does not indicate that defragmentation should be scheduled, repeat obtaining log data and applying the machine learning classification model.

11. The information handling system of claim 8, wherein the plurality of instructions is further configured to, if the first prediction indicates that defragmentation should be scheduled:
execute one or more queries of the database for verification of the presence of fragmentation, and
use the machine learning time series forecasting model subsequent to obtaining the verification of the presence of fragmentation.

12. The information handling system of claim 11, wherein the plurality of instructions is further configured to, if verification of the presence of fragmentation is not obtained via executing the one or more queries, add the at least a portion of the log data and an indication of a non-fragmented database state to a collection of development data for the machine learning classification model.

13. The information handling system of claim 8, wherein the plurality of instructions is further configured to, subsequent to obtaining the second prediction:
execute one or more queries of the database for verification or correction of the future time of low relative database utilization, and
schedule the database defragmentation procedure subsequent to the verification or correction of the future time of low relative database utilization.

14. The information handling system of claim 8, wherein the plurality of instructions is further configured to, as part of using the machine learning time series model:
obtain a set of utilization metric values for the database, wherein the set of utilization metric values comprises values of a utilization metric for a series of time intervals approaching the time of obtaining the set of utilization metric values; and
apply the machine learning time series forecasting model to at least a portion of the set of utilization metric values.

15. A non-transitory computer readable storage medium having program instructions encoded therein, wherein the program instructions are executable to:
obtain log data reflecting transactions in a database, wherein the log data is generated during operation of the database;
apply a machine learning classification model to at least a portion of the log data to obtain a first prediction, wherein the first prediction indicates whether defragmentation of the database should be scheduled;

use a machine learning time series forecasting model to obtain a second prediction, wherein the second prediction identifies a future time interval of low relative database utilization; and schedule a database defragmentation procedure for performance during the future time interval of low relative database utilization.

16. The non-transitory computer readable storage medium of claim 15, wherein the program instructions are further executable to use the machine learning time series forecasting model subsequent to obtaining a first prediction indicating that defragmentation of the database should be performed.

17. The non-transitory computer readable storage medium of claim 15, wherein the program instructions are further executable to, if the first prediction indicates that defragmentation should be scheduled:

execute one or more queries of the database for verification of the presence of fragmentation, and use the machine learning time series forecasting model subsequent to obtaining the verification of the presence of fragmentation.

18. The non-transitory computer readable storage medium of claim 17, wherein the program instructions are further executable to, if verification of the presence of fragmentation is not obtained via executing the one or more queries, add the at least a portion of the log data and an indication of a non-fragmented database state to a collection of development data for the machine learning classification model.

19. The non-transitory computer readable storage medium of claim 15, wherein the program instructions are further executable to, subsequent to obtaining the second prediction:

execute one or more queries of the database for verification or correction of the future time of low relative database utilization, and schedule the database defragmentation procedure subsequent to the verification or correction of the future time of low relative database utilization.

20. The non-transitory computer readable storage medium of claim 15, wherein the program instructions are further executable to, as part of using the machine learning time series forecasting model:

obtain a set of utilization metric values for the database, wherein the set of utilization metric values comprises values of a utilization metric for a series of time intervals approaching the time of obtaining the set of utilization metric values; and apply a machine learning time series forecasting model to at least a portion of the set of utilization metric values.

* * * * *